Sept. 24, 1968        W. A. BAXTER        3,402,526

MODULAR COLLECTOR ELECTRODE FOR ELECTROSTATIC PRECIPITATORS

Filed June 26, 1967

INVENTOR.
WALTER A. BAXTER

BY Boyce C. Dent his Attorney

United States Patent Office 3,402,526
Patented Sept. 24, 1968

---

3,402,526
MODULAR COLLECTOR ELECTRODE FOR ELECTROSTATIC PRECIPITATORS
Walter A. Baxter, Ellicott City, Md., assignor to Koppers Company, Inc., a corporation of Delaware
Filed June 26, 1967, Ser. No. 648,578
2 Claims. (Cl. 55—156)

ABSTRACT OF THE DISCLOSURE

A modular collector electrode for electrostatic precipitators having integral connections formed therein for joining the modules along their lateral edges comprising substantially identical interlocking connection of which one half is formed in the lateral edges of each module which can be snapped into place to form a continuous collector electrode, the interlocking connections preferably having a first flange portion extending perpendicularly from one side of the module, a second perpendicular flange portion extending in the opposite direction from the first flange portion and spaced therefrom to the other side of the module, and a third return flange extending toward the module from the second flange portion and spaced therefrom so as to be substantially perpendicularly aligned with the first flange portion, the third flange portion terminating in a male detent portion cooperating with a female detent bead in the second flange portion of the adjacent module, with the modules being interdigitally reversed to align the half connections to form a complete interlocking connection.

---

*Cross references to related application*

This invention relates generally to the modular electrode structure disclosed in co-pending application Ser. No. 648,549, filed on June 26, 1967, by Robert J. W. Williams and Bartholomew F. Quintilian entitled "Modular Collector Electrode for Electrostatic Precipitators" and assigned to the assignee of the present invention.

BACKGROUND OF THE INVENTION

*Field of the invention*

This invention relates generally to gas separation devices such as electrostatic precipitators and particularly to a unitized or modular assembly forming a collector electrode for electrostatic precipitators.

*Description of the prior art*

Collecting electrodes for electrostatic precipitators are usually hung from supporting structure in the precipitator shell in a manner to permit vibrating or rapping of the electrodes to dislodge collected dust. Since the horizontal lanes of the precipitator formed by parallel spaced electrodes may be quite long, the electrodes are usually made in sections which hang side by side. The lateral adjoining edges of the sections may not be connected although joining them to form a continuous plate-type structure is usually preferred. Joining the plates provides the advantage of stiffening them and, if so, designed, provides a baffle projecting into the gas stream to retard re-entrainment of collected dust caused by the flow of gas past the surface of the plates.

Collector plates are conventionally joined in several ways, for example, by butting the edges and providing an overlapping doubler strip bolted or welded to the plates. A right-angle flange formed on the abutting edges may be welded, bolted or crimped together. In some instances, the right-angle flange may take the form of an angle iron welded to the plate with the abutting flanges bolted together. Another variation provides an angular projection formed in the plate having a leg which overlaps and is welded to a similar leg in the adjoining plate as shown, for example, in Byerly Patent 2,826,262. Some of the aforementioned connections require additional joining components such as plates, angle-irons, bolts and the like. Others require welding or crimping.

SUMMARY OF THE INVENTION

Accordingly, an object of the present invention is to provide a collector electrode structure formed by joining a plurality of modules having interlocking connections integrally formed in the lateral edges thereof to provide both stiffening for the electrode and baffles projecting into the gas stream, and providing easy assembly. In the preferred form of the invention, each module of the collector electrode has one half of an interlocking connection formed on each lateral edge for connection with a corresponding half connection on adjacent modules. Each half connection is preferably in the form of a first flange portion formed perpendicularly to one side of the module and then formed in a reverse bend to form a second flange portion parallel to and spaced from the first flange portion and extending beyond the plane of the module a like distance on the other side of the module. Thereafter, the second flange portion is formed in a reverse bend to form a third flange portion parallel to and spaced from the second flange portion in substantial alignment with the first flange portion. The third flange portion terminates in a male detent portion for cooperation with a female detent bead formed in the second flange portion of an adjacent half connection. The modules are interdigitally reversed to align the half connections to form a complete interlocking connection in the form of a closed elongated loop, the halves of which project into the gas stream on the respective sides of the modules. The connections are locked together by the cooperation of the male and female detent portions. The connections also provide stiffening for the electrode structure.

The present invention obviates the need for fasteners, welding or crimping. The modules are formed in a unitary structure by simply pressing the connections together. A distinct advantage is that localized rapping energy is not attenuated by a discontinuous connection. The connection forms an electrode structure analygous to a single plate structure.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 2:
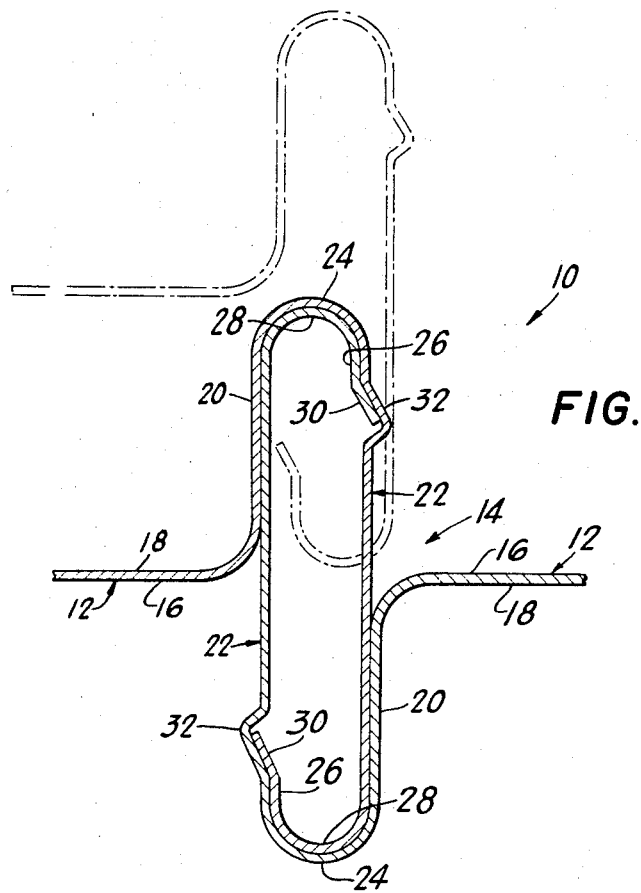
FIGURE 2 is a cross-ssectional view taken along line II—II of FIGURE 1 of a portion of an electrode assembly illustrating the preferred form of the interlocking connection.

Referring now to FIGURE 2, there is illustrated a portion of an electrode assembly generally designated by numeral 10 comprising a pair of modules 12 interconnected along their lateral edges by an interlocking connector 14. Modules 12 have collecting surfaces 16 and 18 which surfaces are interdigitally reversed as illustrated so that one half of connection 14 may be identical on each module 12.

Each half connection comprises a leg or flange 20 formed perpendicularly to surface 18 and a leg 22 formed by a reverse bend 24 in leg 20. Leg 22 extends parallel to and spaced from leg 20 and extends through the plane of the module and beyond surface 16 for a distance substantially equal to the extension of leg 20 from surface 18. A leg 26 is formed by a reverse bend 28 in leg 22 and extends parallel to and spaced from leg 22 in substantial alignment with leg 20. Leg 26 terminates at a distance from surface 16 which distance is greater than the length of leg 26. Thus, the leg 26 of the adjacent half connection can pass through the space provided to be in position for interlocking.

Leg 26 terminates in a male detent portion 30 and is formed to coact with a female detent bead 32 provided in leg 22 of an adjacent half connection as illustrated in FIGURE 2. The male detent 30 of an adjacent half connection coacts with the female detent 32 provided in leg 22. Thus, reciprocal interlocking occurs at assembly.

The dotted lines in FIGURE 2 illustrate the position of the left hand module just prior to assembly. As the modules are pressed together toward a common plane, both leg portions 26 will be compressed towards legs 20 and when the final position is reached, legs 26 will spring outwardly so that male detents 30 will nest in the female detents 32 provided.

The modules may be joined by pressing the conections together between a pair of revolving rolls or pressing them together by hydraulic rams or the like.

The particular proportions of the connection illustrated in FIGURE 2 are not critical and may be varied as desired to provide more or less projection into the gas stream or to change the stiffening characteristics. Although two cooperating detents are preferred, one would suffice and others could be provided where the legs 20 and 22 overlap.

Any convenient means may be used to form the configuration of the half connections such as, for example, a press brake having appropriately shaped dies. However, greater economics can be realized by roll-forming the shape in a manner familiar to those skilled in the art.

Figure 1:
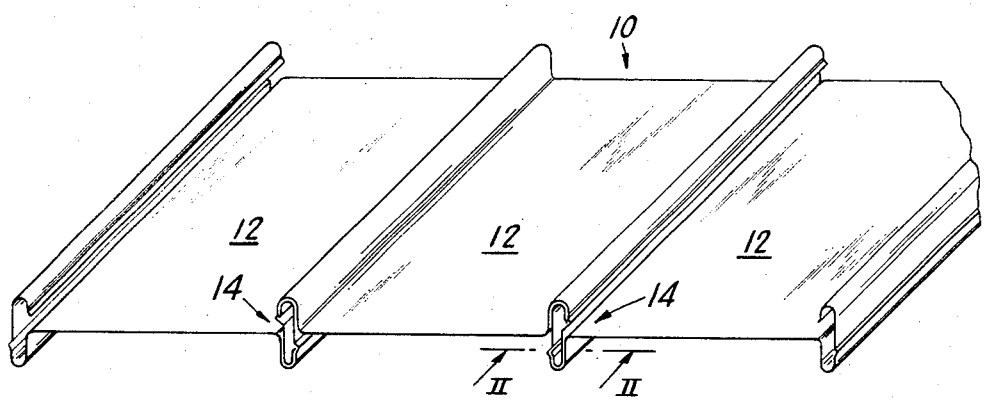
FIGURE 1 is an isometric view schematically illustrating a plurality of modules joined together to form an electrode assembly.

FIGURE 1 illustrates an electrode assembly 10 comprising three modules interdigitally reversed and interlocked by connections 14. Although only three modules are shown, two or more may be joined in the manner described to form a complete assembly.

Having thus described the invention in its best embodiment and mode of operation, what is desired to be claimed by Letters Patent is:

1. A modular electrode structure for an electrostatic precipitator, comprising:
    a plurality of interdigitally reversed modules having interlocking means formed by at least one lateral edge thereof for mating connection with an interlocking means of substantially the same form formed by at least one lateral edge of an adjacent module,
    each said interlocking means on each module comprising first, second and third leg portions,
    said first and second leg portions forming a first convolution projectnig from a first collecting surface on said modules,
    said second and third leg portions forming a second convolution projecting from a second collecting surface on the opposite side of said modules,
    said first and second convolutions being substantially diametrically opposite one another,
    said first and second convolutions of a first module respectively mating with second and first convolutions of the interlocking means formed by the lateral edge of an adjacent second module, said first module having a second convolution defining a space between it and its second collecting surface which space receives a second convolution formed in said adjacent second module interlocking means and the second convolution of said adjacent second module interlocking means defines a space between it and a second collecting surface of said adjacent second module which space receives said second convolution on said first module and said mating convolutions define a closed elongated loop forming said interlocking means,
    mating detent means formed in said interlocking means for maintaining said mating convolution in locking engagement.

2. The modular electrode structure of claim 1 wherein said mating detent means comprises a female detent bead formed in said second leg portion for mating with a male detent portion in said second module and said third leg portion terminates in a male detent portion for mating with a famale detent bead formed in said second module for maintaining said mating convolutions in interlocking engagement.

References Cited

UNITED STATES PATENTS

| | | | |
|---|---|---|---|
| 95,732 | 10/1869 | Roys | 52—522 |
| 1,096,944 | 3/1914 | Phillips | 52—588 X |
| 1,946,694 | 2/1934 | Hunter. | |
| 2,077,162 | 4/1937 | Ansel | 52—522 X |
| 2,830,334 | 4/1958 | Schroyer | 52—630 X |
| 2,842,237 | 7/1958 | Paulssen. | |
| 2,893,073 | 7/1959 | Humphrey | 55—588 X |
| 2,996,144 | 8/1961 | Phyl | 55—130 |
| 3,008,541 | 11/1961 | Wachter | 55—156 X |
| 3,269,075 | 8/1966 | Marini et al. | 52—522 |
| 3,282,029 | 11/1966 | Stevernagel | 55—154 X |
| 3,290,850 | 12/1966 | Byrne et al. | 52—630 |
| 3,302,353 | 2/1967 | DuPradal | 52—469 |
| 3,347,001 | 10/1967 | Cosden | 52—105 |

FOREIGN PATENTS

| | | |
|---|---|---|
| 222,046 | 5/1959 | Australia. |
| 1,330,095 | 5/1963 | France. |
| 963,109 | 7/1964 | Great Britain. |
| 403,249 | 6/1966 | Switzerland. |

OTHER REFERENCES

Netherlands printed application No. 288,724, printed March 1965.

HARRY B. THORNTON, *Primary Examiner.*

D. TALBERT, *Assistant Examiner.*